Patented July 10, 1934

1,965,627

UNITED STATES PATENT OFFICE 1,965,627

ARCHITECTURAL LACQUER SYSTEM

Charles Bogin, Terre Haute, Ind., assignor to Commercial Solvents Corporation, Terre Haute, Ind., a corporation of Maryland No Drawing. Application July 28, 1930, Serial No. 474,294

6 Claims. (Cl. 91—68)

This invention relates to architectural lacquer systems. More specifically, it relates to an architectural lacquer system in which a rubber-containing undercoat is employed.

In the past, lacquer has been recommended for architectural use, due to its many advantages such as durability, quick drying, ease of cleaning, etc. However, it has not come into use to a very great extent due to the tendency of lacquer films to peel when applied to such surfaces as plaster and the like. This is especially true if the plaster is not dry, or if, after the lacquer film is dry, moisture seeps through the plaster from the other side.

It is known that paints and enamels do not peel to such a great extent as lacquer when applied to architectural surfaces, so they have been tried as undercoats for lacquers. The result, however, has been no better than with lacquer alone. In this case, there is an added tendency toward "lifting" during application, i. e., the paint film is swelled and an imperfect, wrinkled, or blistered film results.

It has now been found that rubber-containing undercoats are eminently suited for this purpose. Undercoats of this nature are rapid-drying, stable, and possess a high degree of adhesion for most surfaces. The lacquer films, when applied to these undercoats, are found to adhere strongly, even under very adverse conditions. For example, when the reverse sides of plaster panels were exposed for long periods of time to paper saturated with moisture, most lacquer, enamel-lacquer, and paint-lacquer systems were found to be most unsatisfactory, showing very poor adhesion, peeling, blistering, etc.; the rubber undercoat-lacquer systems, on the other hand, were found to adhere excellently throughout the test.

The term "rubber-containing undercoat" as use in the specification and claims is intended to include coating materials containing not only rubber, but also rubber derivatives such as chlorinated rubbers, and thermoplastic rubber products such as "thermoprene" (J. I. E. C. 19, 1325). Of course, butadiene condensation products or other synthetic rubber products having the same properties as the above-mentioned compounds are also to be included.

It is known that rubber solutions of sufficiently high concentrations to be practical as coating materials are too viscous for use. The viscosity of the rubber may be reduced by chlorinating, milling, vulcanizing, etc., but for use in undercoats in carrying out this invention, it is preferred to use compounds of the thermoprene type. These are obtained by heating the rubber with organic sulphonyl chlorides, or sulphonic acids. By correct treatment, a shellac-like product is obtained, "thermoprene-SL", which is suitable for use as a coating material. The rubber paints (which are more properly lacquers since volatile solvents are employed) are obtained by dissolving the thermoprene in the usual rubber solvents (J. I. E. C. 20, 157).

Although it is preferred to use paints of the type Thermoprene SL, it is to be understood that other paints or coating materials of this type may be employed. Also, if desired, the rubber-containing coating may contain pigments, drying oils, driers, etc. according to the known formulations. The exact composition of the material is not essential to this invention.

In carrying out this invention a coat of the rubber-containing undercoat material is first applied to the surface. Of course, more than one coat may be applied if desired, but it has generally been found that one coat is sufficient. The lacquer is then applied after the undercoat has dried. In most cases this will be only a few hours since rubber paints of this type contain volatile solvents and are rapid-drying. Any of the usual lacquers are then sprayed or brushed on in the known manner. As many coats of lacquer are used as may be desired, depending upon the color of the undercoat, the color and hiding power of the lacquer, etc. A nitrocellulose lacquer containing a plasticizer, gums, high-boiling solvents, and a pigment of high hiding power is to be preferred, but this invention is not dependent upon the specific composition of the lacquer. For example, cellulose acetate lacquers may be employed, if desired.

It is to be understood further that while this invention is especially adapted to the finishing of architectural surfaces, it may be applied to other surfaces such as metal objects, etc. if desired.

The invention now having been described, what is claimed is:

1. A process of finishing architectural or other surfaces comprising applying thereto at least one coat of an adherent undercoating, the greater part of the non-volatile constituents of said undercoating consisting of "Thermoprene" type rubber compounds, drying said undercoating, and applying thereto at least one coat of a cellulose ester lacquer.

2. A process of finishing architectural or other surfaces comprising applying thereto at least one coat of an adherent undercoating, the greater part of the non-volatile constituents of said undercoating consisting of "Thermoprene" type rubber compounds, drying said undercoating, and applying thereto at least one coat of a cellulose ester lacquer.

3. A process of finishing architectural or other surfaces comprising applying thereto at least one coat of an adherent undercoating, the greater part of the non-volatile constituents of said undercoating consisting of "Thermoprene" type rubber compounds, drying said undercoating, and applying thereto at least one coat of a nitrocellulose lacquer.

4. A process of finishing architectural or other surfaces comprising applying thereto at least one coat of an adherent undercoating, the greater part of the non-volatile constituents of said undercoating consisting of "Thermoprene" type rubber compounds, drying said undercoating, and applying thereto at least one coat of a nitrocellulose lacquer.

5. In a process of finishing achitectural or other surfaces in which a cellulose ester lacquer is employed as the finishing coat, the step which comprises applying to the surface at least one coat of an adherent undercoating, the greater part of the non-volatile constituents of said undercoating consisting of "Thermoprene" type rubber compounds.

6. In a process of finishing architectural or other surfaces in which a nitrocellulose lacquer is employed as the finishing coat, the step which comprises applying to the surface at least one coat of an adherent undercoating, the greater part of the non-volatile constituents of said undercoating consisting of "Thermoprene" type rubber compounds.

CHARLES BOGIN.